(12) United States Patent
Lucatorto

(10) Patent No.: US 6,757,998 B1
(45) Date of Patent: Jul. 6, 2004

(54) GRILL MOUNTED FRONT LICENSE PLATE BRACKET

(76) Inventor: Patrick M. Lucatorto, 48 East Boulder Creek Rd., Simi Valley, CA (US) 93065

( * ) Notice: Subject to any disclaimer, the term of this patent is extended or adjusted under 35 U.S.C. 154(b) by 0 days.

(21) Appl. No.: 10/361,596

(22) Filed: Feb. 11, 2003

(51) Int. Cl.$^7$ .................................................. G09F 7/00
(52) U.S. Cl. .......................................... 40/200; 40/209
(58) Field of Search .......................... 40/200, 209, 201, 40/202, 203, 208, 210, 591, 643; 293/115; 180/68.6

(56) References Cited

U.S. PATENT DOCUMENTS

| | | | | |
|---|---|---|---|---|
| 1,092,887 A | * | 4/1914 | Adams .......................... | 40/200 |
| 1,248,043 A | * | 11/1917 | Ware ............................ | 40/209 |
| 1,876,405 A | * | 9/1932 | Enscott ......................... | 40/618 |
| 1,913,773 A | * | 6/1933 | Scaplen ........................ | 40/209 |
| 2,098,156 A | * | 11/1937 | Nielsen ......................... | 40/202 |
| 2,098,432 A | * | 11/1937 | Roose ........................... | 40/203 |
| 2,177,215 A | * | 10/1939 | Hodgkinson ................. | 40/200 |
| 5,363,575 A | * | 11/1994 | Sawyer et al. ................ | 40/308 |
| 5,581,852 A | * | 12/1996 | Zakrajsek ..................... | 24/289 |
| 6,167,645 B1 | * | 1/2001 | Gasko et al. .................. | 40/200 |

FOREIGN PATENT DOCUMENTS

| | | | |
|---|---|---|---|
| GB | 2060235 | * | 4/1981 |
| JP | 8-91156 | * | 4/1996 |

* cited by examiner

Primary Examiner—Mark T. Le
(74) Attorney, Agent, or Firm—Richard C. Litman

(57) ABSTRACT

A grill mounted front license plate bracket comprises at least two mounting plates, spacing rods, fasteners and fastener engaging elements. Each of the mounting plates has a set of holes adapted to receive the fasteners. A center mounting plate is positioned on the exterior surface of the vehicle grill. The spacing rods extend outwardly from the front surface of the center mounting plate to the rear side of a front mounting plate. The spacing rods extend the front mounting plate beyond the front end of the vehicle. The fasteners extend through the holes in each of the mounting plates, the spacing rods and the grill. The fastener engaging elements receive the fasteners and releasably secure the license plate bracket to the front. The license plate and a license plate display frame are releasably mounted to the front mounting plate using additional fasteners.

15 Claims, 6 Drawing Sheets

GRILL MOUNTED FRONT LICENSE PLATE BRACKET

BACKGROUND OF THE INVENTION

1. Field of the Invention

The present invention relates to license plate holders for vehicles, such as automobiles, trucks and buses, and more particularly to a grill mounted front license plate bracket

2. Description of the Related Art

Generally, vehicles such as automobiles, trucks and buses are required to display a license plate on the back, and in some instances the front of the vehicle. Various devices have been designed for holding license plates while attached to a vehicle. In general, the license plates are permanently fixed to the vehicle using fasteners. The license plate is general mounted in a license plate holder that is then secured to the vehicle using a fastening means through a set of holes in the body or bumper of the vehicle.

Many vehicles are not equipped with license plate mounts on the front of the vehicle. In some states, however, it is required by law to have license plates displayed on both the rear as well as the front of the vehicle. It is common for license plate mounting systems to be attached to the front of vehicles by drilling holes in the bumper or other suitable portion of the body of the vehicle and fastening the mounting system through the holes. Examples of common license plate mounts are provided in the following patent documents.

U.S. Design Pat. No. 460,394 to Wang discloses an ornamental design for an invertible plate frame and mounting adapter, as shown and described.

U.S. Pat. No. 3,835,563 to Hanstad discloses a license plate retainer. The disclosed invention is a display holder for a vehicle license plate having a rigid backing section and retainer flanges extending along the opposite longitudinal edges of the backing section.

U.S. Pat. No. 4,314,417 to Cain describes a motor vehicle registration plate holder. The registration plate holder consists of a backing member and a frame. The backing member is adapted for attachment to a motor vehicle. The backing member is attached to a motor vehicle fender by means of headed screws that are passed through slots in the backing member and bolted into the fender or other suitable position on the body of the vehicle. The frame is made from a plastic material and covers the periphery of the registration plate when located on the holder. The registration plate is secured between the frame and the backing member.

U.S. Pat. No. 4,406,490 to Torii et al. discloses a license plate holder at the rear panel of a vehicle. The license plate holder includes a plate holder member that affords a first flat surface portion and a pair of second flat surface portions. The license plate is mounted on the first surface portion, and illuminating lamps for the license plate are mounted on the second surface portions. The plate holder member is equipped with a plurality of through holes for receiving bolts that mount the license plate holder onto the rear panel of the vehicle.

U.S. Pat. No. 4,445,291 to Easley discloses a license plate frame with detachable display panels. The license plate frame includes an upper member, a lower member, a pair of side members, a display panel and a retaining means. The display panel further includes a display portion and a retaining portion. The license plate is interposed between the bumper of a car and the license plate frame. The license plate and frame are secured to the car using a system of brackets and threaded screws.

U.S. Pat. No. 4,657,296 to Nishii et al. discloses a license plate mounting device in the front bumper of an automobile. The present invention comprises an improved front bumper with an elongated main body with a pair of recesses receding rearwardly of the vehicle body. A pair of rectangular caps, having substantially the same dimensions as the recesses, are placed in the recesses to provide a smooth continuous outer surface for the bumper. Two holes extend through the license plate, the rectangular caps and the recesses and are adapted to receive a pair of fastening bolts to secure the license plate to the bumper.

U.S. Pat. No. 5,813,640 to Koch et al. discloses a removable license plate holder and mounting system. The mounting system includes a mounting bracket having a horizontal base portion adapted to extend underneath an overhanging portion of a vehicle, such as a bumper or grillwork. The base portion provides a means for adapting the license plate holder to a variety of vehicles. The mounting system further includes fasteners that are adapted to interact with holes in the horizontal underside of the portion of the vehicle to which the bracket will be mounted.

U.S. Pat. No. 6,167,645 to Gasko et al. describes a license plate bracket for mounting a license plate to the grill of an automobile. The bracket includes a pair of resilient hooks for securing the bracket to the grill. The hooks replace hardware such as screws and bolts which are incompatible with the thin plastic ribs found on modern vehicle grills. The entire bracket, including the hooks, is made of a single piece of plastic molding.

Many car owners do not wish to drill holes into the bumper or other portion of the body of their automobiles. Therefore what is needed is a front license plate mounting system that allows a license plate to be secured to the body of a vehicle without creating holes in, or otherwise damaging, the body of the automobile. What is further needed is a license plate mounting system that can be attached to the front grill of any common vehicle. What is still further needed is a front grill license plate mounting system that is easily attached to and released from a vehicle.

None of the above inventions and patents, taken either singularly or in combination, is seen to describe the instant invention as claimed. Thus a grill mounted front license plate bracket solving the aforementioned problems is desired.

SUMMARY OF THE INVENTION

The present invention is a grill mounted front license plate bracket for mounting a license plate to the front of a vehicle. The grill mounted front license plate bracket comprises at least two mounting plates, a plurality of fasteners and a plurality of spacing rods. In the preferred embodiment of the present invention the license plate bracket comprises a front and a center mounting plate. The mounting plates are equipped with a pair of holes that extend from the front side of each mounting plate and out through the rear side of each mounting plate. The pair of holes is adapted for receiving a fastener.

The spacing rods are located between the front mounting panel and the center mounting panel. The spacing rods extend the front mounting panel past the front surface of the vehicle so as to not rub against the front of the vehicle. The fastener passes through the holes on the front of the front mounting panel. The fastener then extends through the spacing rods, the center mounting panel, and the grill of the vehicle. Holes are created in the grill of the vehicle to receive the fasteners. Fastener engaging means receive the ends of the fasteners after they pass through the rear side of the vehicle grill to secure the fasteners inside of the mounting panel holes.

A second pair of holes is located through the front mounting plate. The second pair of holes is adapted to receive a pair of license plate fasteners that mount a standard license plate to the front surface of the front mounting panel. Once the grill mounted front license plate bracket is secured to the vehicle, a license plate is then fastened to the front mounting panel of the bracket. Optionally, a license plate frame may be secured to the front of the license plate and the front mounting panel as well.

In a second embodiment of the present invention, the grill mounted front license plate bracket further comprises a back mounting plate. The back mounting plate is located on the rear side of the vehicle grill.

Accordingly, it is a principal object of the invention to provide a front license plate bracket that may be secured to the front grill of any common vehicle.

It is another object of the invention to provide a front license plate bracket that is easily secured to and released from the grill of any common vehicle.

It is a further object of the invention to provide a means for attaching a license plate to the front of any common vehicle without having to drill holes into, or otherwise damage, the body of the vehicle.

Still another object of the invention is to provide a license plate bracket with a means for preventing the license plate from coming into contact with the front of the vehicle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a grill mounted front license plate bracket. The grill mounted front license plate bracket is used to mount a license plate to the front of a vehicle that is not equipped with a front license plate mount The present invention provides a means for mounting a license plate to a vehicle without having to drill mounting holes through the body of the vehicle.

Figure 1:
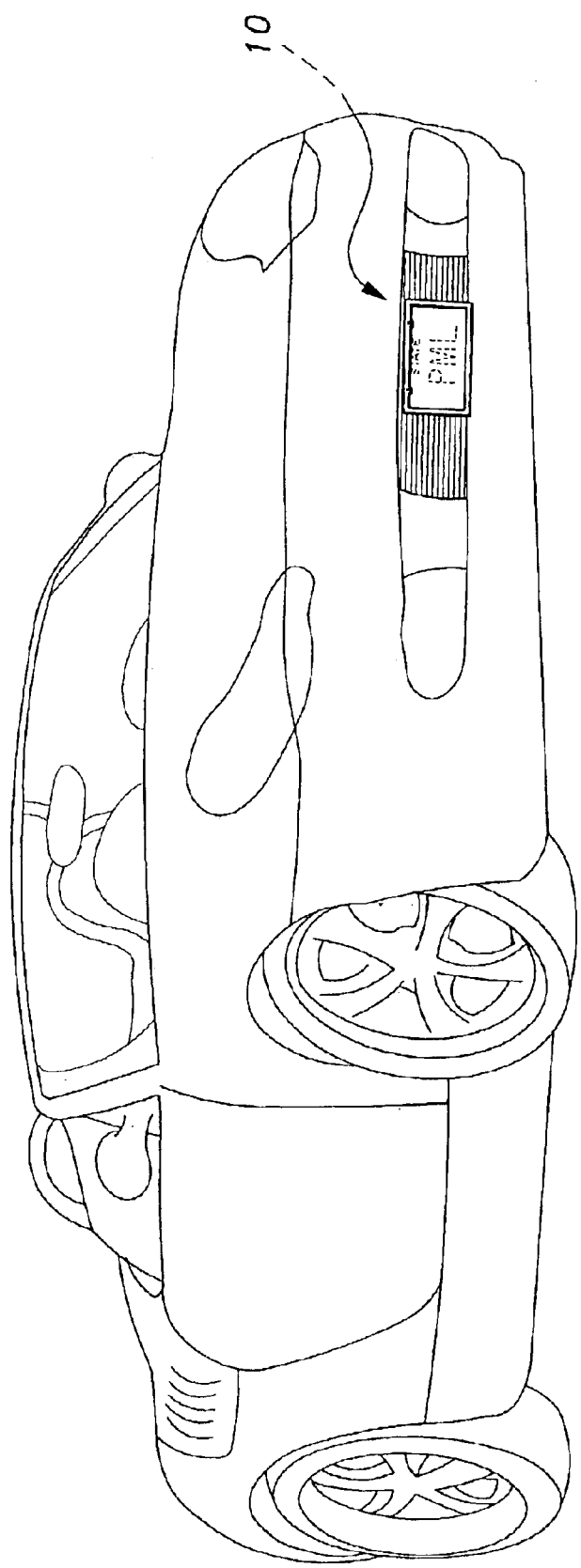
FIG. 1 is an environmental, perspective view of a grill mounted front license plate bracket according to the present invention.

FIG. 1 depicts an environmental, perspective view of the grill mounted front license plate bracket 10 secured to the front of an automobile. The bracket 10 may be used with any common vehicle including, but not limited to, automobiles, trucks and buses. In the embodiment depicted in FIG. 1 the grill mounted front license plate bracket 10 is secured to the grill of an automobile that is not equipped with a front license plate mount.

Figure 2:
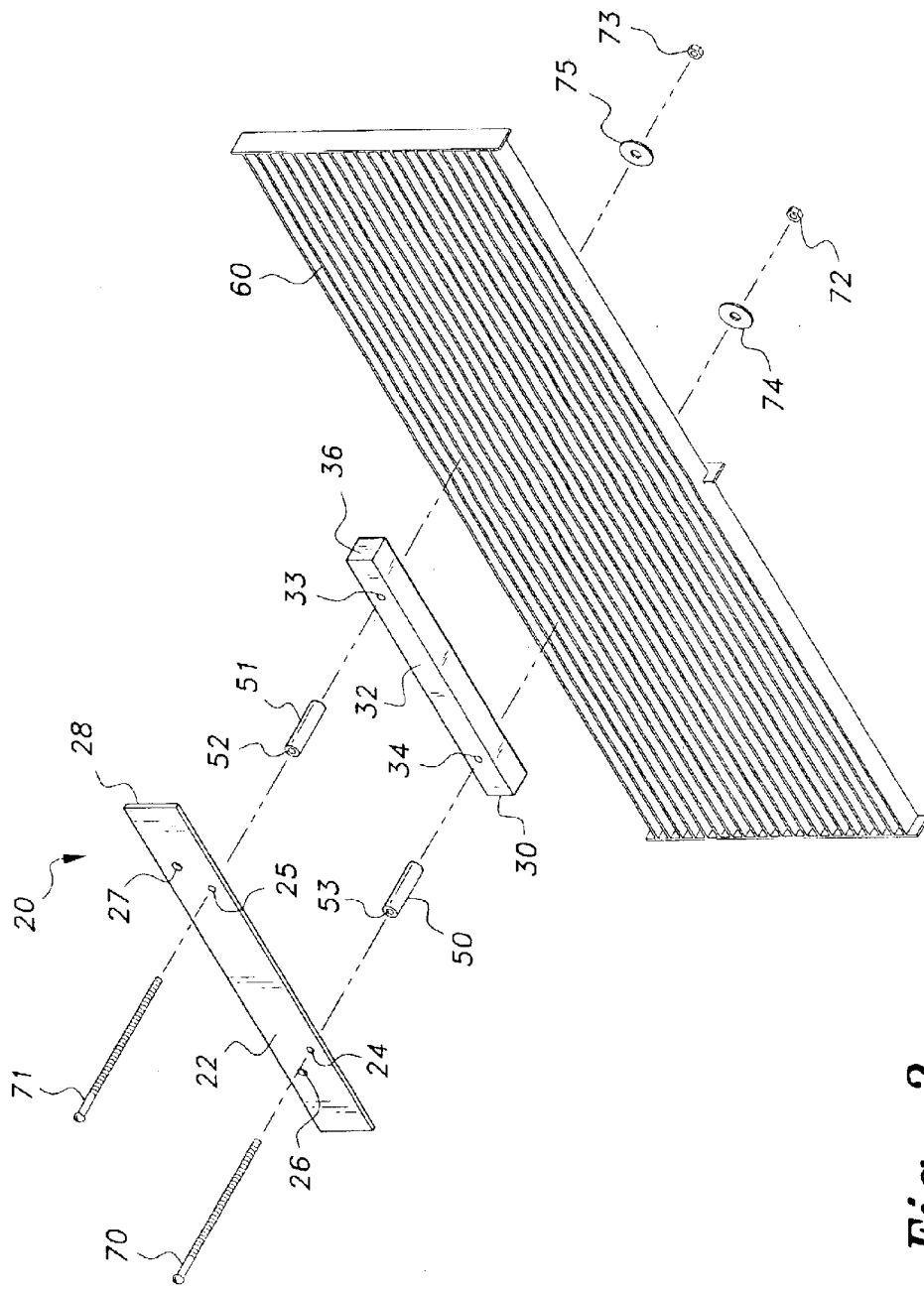
FIG. 2 is an exploded view of a preferred embodiment of the grill mounted front license plate bracket according to the present invention.

FIG. 2 depicts an exploded view of the preferred embodiment of the grill mounted front license plate bracket 10. The bracket 10 is comprised of a front mounting panel 20, a center mounting panel 30, and spacing rods 50 and 51. The center mounting panel 30 is located on the exterior side of the front grill 60. The spacing rods 50, 51 extend outward from the front surface 32 of the center mounting plate 30 to the front mounting plate 20.

The front mounting plate 20 is equipped with two sets of holes on the front surface 22 that extend through the entire thickness 28 of the front plate 20. The front fastener holes 24, 25 are adapted, to receive a pair of grill fasteners 70, 71. The license plate holes 26, 27 are adapted to receive license plate fasteners 100, 101 (shown in FIG. 4). The front plate 20 is preferably 11 inches wide, 1.5 inches high and ⅛ inch thick. These dimensions are only exemplary and do not limit the present invention.

The center mounting plate 30 is equipped with a set of holes on the front surface 32 that extend through the entire thickness 36 of the center plate 30. The center fastener holes 33, 34 are adapted to receive the grill fasteners 70, 71. The center plate 30 is preferably 8 inches wide, ¾ inch high and ¾ inch thick. These dimensions are only exemplary and do not limit the present invention.

The spacing rods 50, 51 are cylindrical in shape and each have a center through hole 52 and 53 respectively. The through holes 52, 53 are adapted to receive the grill fasteners 70, 71. The spacing rods are located between the center mounting plate 30 and the front mounting plate 20. The spacing rods 50, 51 extend the front mounting plate 20 beyond the front end of the vehicle to increase the visibility of the license plate and to prevent the front mounting plate 20 from damaging the body of the vehicle. The spacing rods 50, 51 are of a length suitable to extend the front mounting plate 20 beyond the front end of the vehicle. In preferred embodiments of the present invention, the spacing rods 50, 51 are 1.5 inches long. The spacers, however, are not limited in this manner and may be made any suitable length.

The center mounting plate 30 is positioned on the exterior side of the vehicle grill 60. The spacing rods 50, 51 extend outwardly from the front surface 32 of the center mounting plate 30 and attach to the rear side of the front mounting plate 20. The entire assembly is mounted to the vehicle grill by the grill fasteners 70, 71. The grill fasteners 70, 71 enter the front fastener holes 24, 25 and extend through the front mounting panel 20. The grill fasteners 70, 71 then extend through the through-holes 52, 53 of spacing rods 50, 51 and enter into the center fastener holes 33, 34. The grill fasteners 70, 71 extend through the center mounting plate 30 and the vehicle grill 60. Holes are created in the vehicle grill 60 to allow the grill fasteners 70,71 to extend through A pair of fastener engaging means 72, 73 engage the grill fasteners 70, 71 on the rear side of the vehicle grill 60. The fastener engaging means 72, 73 releasably secure the grill fasteners 70, 71 in the holes of the mounting bracket 10. Each fastener engaging means 72, 73 is equipped with a washer 74 and 75 respectively. In preferred embodiments the fastener engaging means 72, 73 are nylon insert locking nuts. The fastener engaging means 72, 73 are not limited in this manner and any suitable fastener engaging means may be used.

Figure 3:
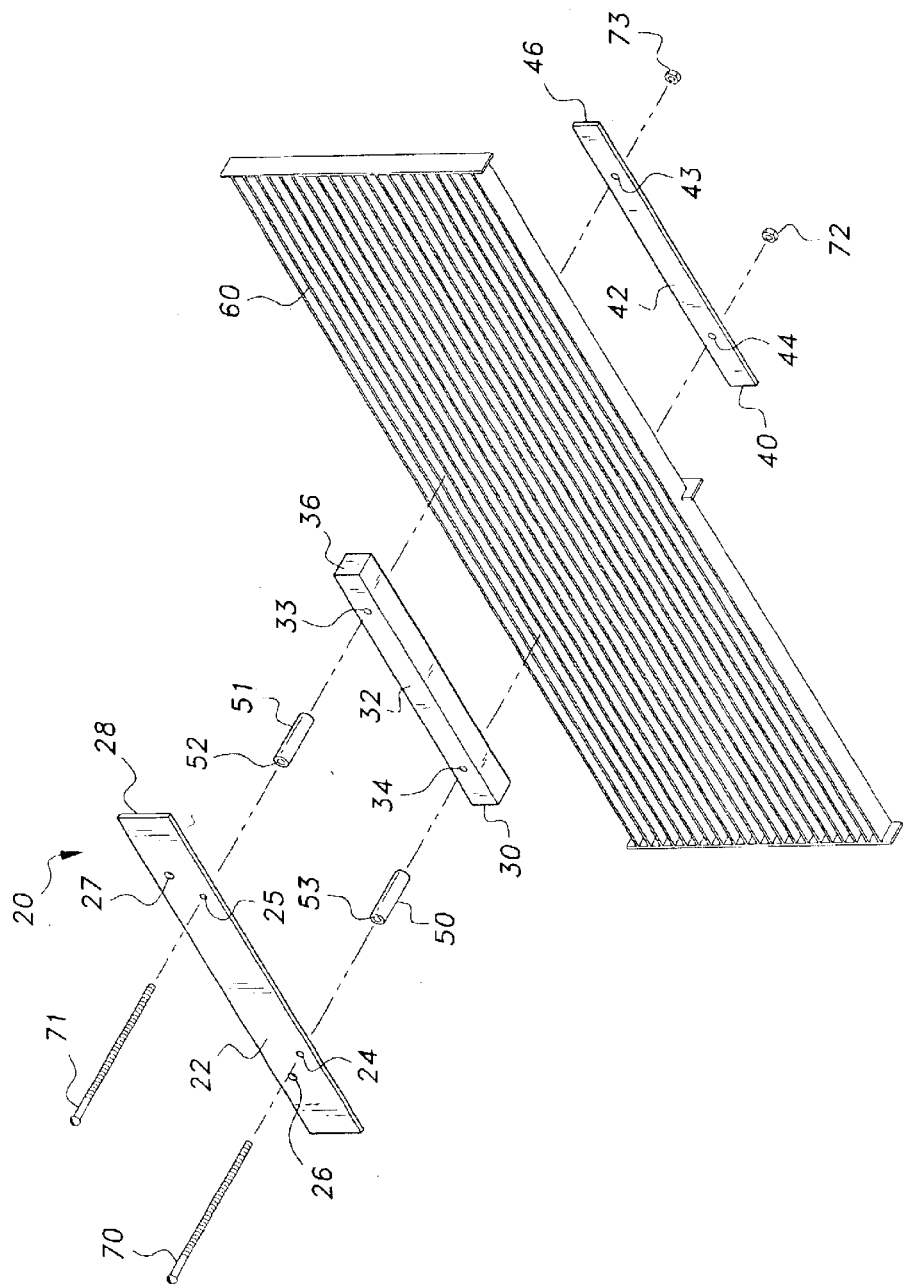
FIG. 3 is an exploded view of an alternate embodiment of the grill mounted front license plate bracket according to the present invention.

FIG. 3 depicts an alternate embodiment of the grill mounted front license plate bracket 10. In the present embodiment the bracket 10 further comprises a third mounting plate. A back mounting plate 40 is positioned on the rear side of the vehicle grill 60. In this embodiment the bracket 10 is releasably secured to both the front and back of the vehicle grill 60. The back mounting plate 40 is equipped with back fastener holes 43, 44. The back fastener holes 43, 44 are adapted to receive the grill fasteners 70, 71. In the present embodiment, the grill fasteners 70, 71 extend through the front mounting plate 20, the spacing rods 50, 51, the center mounting plate 30, the vehicle grill 60 and the back mounting plate 40. The fastener engaging means 72, 73 are located on the rear side of the back mounting bracket 40.

Figure 4:
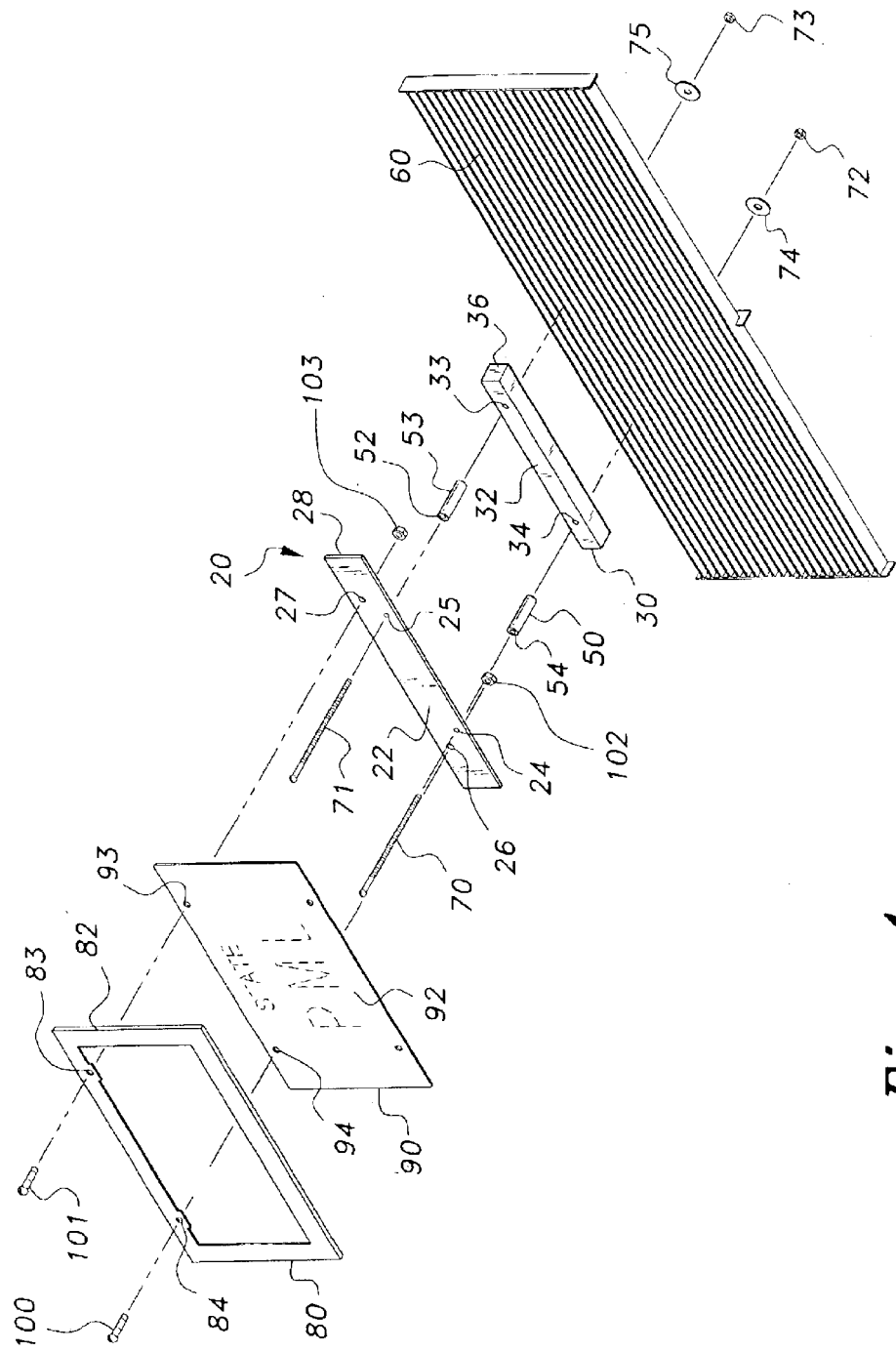
FIG. 4 is an exploded view of a standard license plate attached to a front panel of the grill mounted front license plate bracket according to the present invention.

FIG. 4 depicts an exploded view of a standard license plate 90 attached to the front mounting plate 20 of the present grill mounted front license plate bracket 10. The front mounting plate 20 is equipped with an additional set of holes. The plate fastener holes 26, 27 are adapted to receive license plate fasteners 100, 101. Also, depicted in FIG. 4 is an optional license plate display frame 80. The license plate display frame 80 commonly contains a design or message that is personal to the owner of the vehicle. The display frame 80 is mounted on the front 92 of the license plate 90 and borders the front 92 of the license plate 90. The license plate fasteners 100, 101 first pass through a set of display holes 83, 84 in the display frame 80. The fasteners 100, 101 then pass through a set of license plate holes 93, 94 in the license plate 90 and then through the plate fastener holes 26, 27 on the front mounting plate 20. Fastener engaging means 102, 103 are located on the rear end of the front mounting panel 20 and are adapted to receive the plate fasteners 100, 101. The plate fasteners 100, 101 and the engaging means 102, 103 releasably secure the license plate 90 and display frame 80 to the front mounting panel 20.

Figure 5:
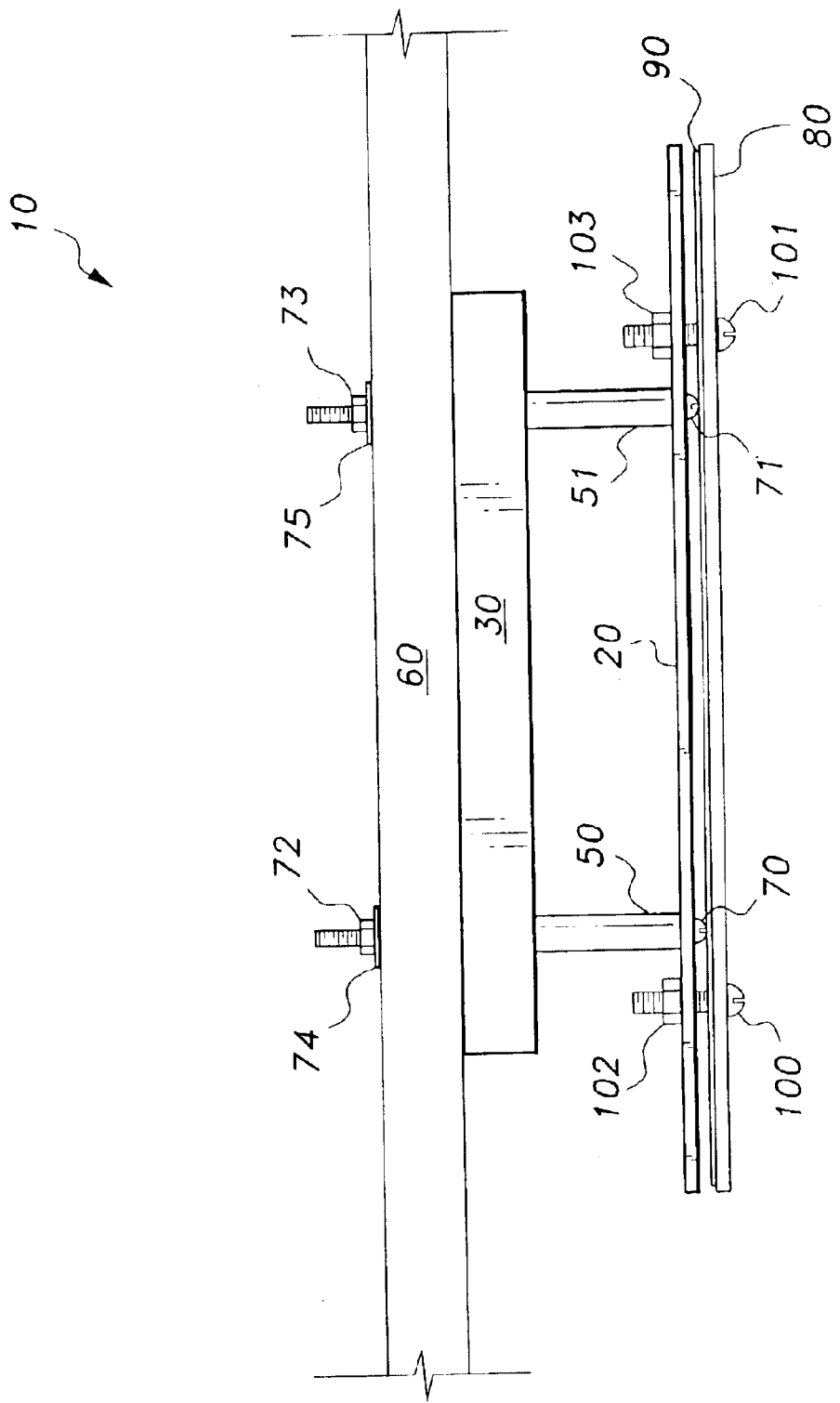
FIG. 5 is a top view of the preferred embodiment of the grill mounted front license plate bracket holding a license plate depicted in FIG. 2.
Figure 6:
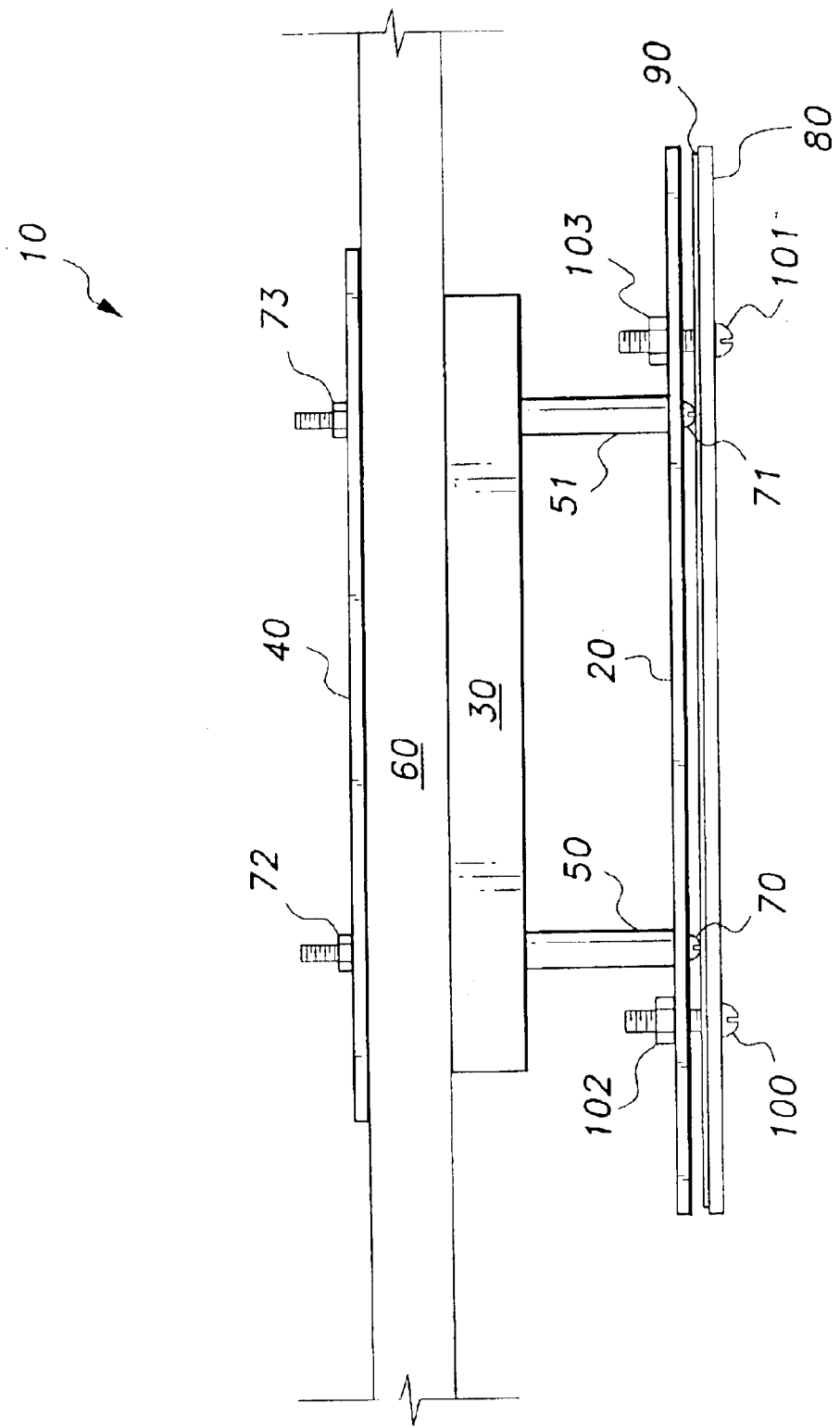
FIG. 6 is a top view of the alternate embodiment of the grill mounted front license plate bracket holding a license plate depicted in FIG. 3.

FIG. 5 is a top view of the preferred embodiment of the grill mounted front license plate bracket 10 as depicted in FIG. 2. FIG. 6 is a top view of the alternate embodiment of the grill mounted front license plate bracket 10 as depicted in FIG. 3. FIG. 5 and FIG. 6 show the entire bracket 10 assembled and attached to the license plate 90 and display frame 80.

It is to be understood that the present invention is not limited to the embodiments described above, but encompasses any and all embodiments within the scope of the following claims.

I claim:

1. A grill mounted front license plate bracket comprising:
    at least two mounting plates, wherein said mounting plates further comprise grill fastener holes;
    spacing means, wherein each said spacing means further comprises a through hole extending through the entire length of said spacing means;
    grill fasteners that extend through said grill fastener holes of said mounting plates, through said through holes of said spacing means, and through the grill of said vehicle; and
    grill fastener engaging means for releasably securing said grill fasteners in said grill fastener holes;
    wherein a first of said mounting plates is positioned on a front side of said vehicle grill, said spacing means extend outwardly from a front surface of said first mounting plates and attach to the rear side of a second of said mounting plates, and said grill fastening engaging means are located on the rear side of said vehicle grill.

2. The grill mounted front license plate bracket according to claim 1, wherein said spacing means are cylindrical rods.

3. The grill mounted front license plate bracket according to claim 1, wherein said spacing means are a suitable length to extend said second mounting plate beyond the front of the body of said vehicle.

4. The grill mounted front license plate bracket according to claim 1, wherein said second mounting plate further comprises plate holes adapted for receiving license plate fasteners.

5. The grill mounted front license plate bracket according to claim 1, wherein said license plate is releasably secured to the front surface of said second mounting plate.

6. The grill mounted front license plate bracket according to claim 1, wherein said grill fastener is a round head bolt.

7. The grill mounted front license plate bracket according to claim 4, wherein said license plate fasteners are round head bolts.

8. The grill mounted front license plate bracket according to claim 1, wherein said grill fastener engaging mechanism is a nylon insert locking nut.

9. The grill mounted front license plate bracket according to claim 5, wherein a license plate display frame is releasably secured to the front end of said license plate.

10. The grill mounted front license plate bracket according to claim 1, further comprising a third mounting plate located on the rear side of said vehicle grill.

11. The grill mounted front license plate bracket according to claim 10, wherein said third mounting plate further comprises through holes that are adapted to receive said grill fasteners.

12. A grill mounted front license plate bracket comprising at least a front and center plate member separated by a spacing means; wherein said center plate is secured to the front surface of the front grill of a vehicle by a fastener that extends through said front plate member, said spacing means, said center plate member and said front grill; said fastener being releasably secured to the back surface of said grill by a fastener engaging mechanism; wherein a pair of through holes are located on the front surface of said front plate member and said center plate member, said pair of through holes being adapted to receive said fastener.

13. The grill mounted front license plate bracket according to claim 12, further comprising a back mounting plate located on the rear side of said vehicle grill.

14. The grill mounted front license plate bracket according to claim 13, wherein said back mounting plate further comprises through holes that are adapted to receive said fasteners.

15. A grill mounted front license plate bracket comprising:
    three mounting plates, wherein said mounting plates further comprise grill fastener holes;
    spacing means, wherein each said spacing means further comprises a through hole extending through the entire length of said spacing means;
    grill fasteners that extend through said grill fastener holes of said mounting plates, through said through holes of said spacing means, and through the grill of said vehicle; and grill fastener engaging means for releasably securing said grill fasteners in said grill fastener holes;

wherein a first of said mounting plates is positioned on a rear side of said vehicle grill, a second of said mounting plates is positioned on a front side of said vehicle grill, said spacing means extend outwardly from a front surface of said second mounting plates and attach to the rear side of a third of said mounting plates, and said grill fastening engaging means are located on the rear side of said vehicle grill.

* * * * *